United States Patent
Chan et al.

(10) Patent No.: US 10,671,634 B2
(45) Date of Patent: Jun. 2, 2020

(54) ADJUSTING PUSH NOTIFICATIONS BASED ON LOCATION PROXIMITY

(71) Applicant: Razer (Asia-Pacific) Pte. Ltd., Singapore (SG)

(72) Inventors: Michael A. Chan, San Francisco, CA (US); Justin Quan, San Francisco, CA (US)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 506 days.

(21) Appl. No.: 14/042,507

(22) Filed: Sep. 30, 2013

(65) Prior Publication Data
US 2014/0095617 A1 Apr. 3, 2014

Related U.S. Application Data

(60) Provisional application No. 61/708,794, filed on Oct. 2, 2012.

(51) Int. Cl.
*G06F 16/27* (2019.01)
*H04B 7/26* (2006.01)
(Continued)

(52) U.S. Cl.
CPC .............. *G06F 16/27* (2019.01); *H04B 7/26* (2013.01); *H04L 67/06* (2013.01);
(Continued)

(58) Field of Classification Search
CPC .. G06F 17/30194; G06F 16/27; H04W 88/00; H04W 84/12; H04B 7/26; H04M 1/7253;
(Continued)

(56) References Cited

U.S. PATENT DOCUMENTS 6,075,994 A 6/2000 Bhat
7,865,089 B2 1/2011 Andreoli et al.
(Continued)

OTHER PUBLICATIONS

Co-Pending U.S. Appl. No. 14/267,748 by Chan, M.A., filed May 1, 2014.
(Continued)

*Primary Examiner* — Randy A Scott
*Assistant Examiner* — Xiang Yu
(74) *Attorney, Agent, or Firm* — Mattingly & Malur, PC

(57) ABSTRACT

Technology is disclosed for transmitting notification updates to computing devices ("the technology"). Various embodiments of the technology includes a proxy server that facilitates transmission of notifications to the computing devices based on a location proximity and/or access pattern of the computing devices. In one such embodiment, if a particular computing device of the user is not within a predefined location proximity of a primary computing device of the user, the proxy server delays or decreases the frequency of transmission of the notifications to the particular mobile device. In another example, based on the access pattern of the particular computing device, if the proxy server determines that the user is not likely to use the particular computing device, e.g. until a certain point of time, the proxy server delays or decreases the frequency of the transmission of the notifications to the particular mobile device until around that certain point of time.

23 Claims, 8 Drawing Sheets

(51) Int. Cl.
*H04L 29/08* (2006.01)
*H04M 1/725* (2006.01)

(52) U.S. Cl.
CPC .......... *H04L 67/1095* (2013.01); *H04L 67/26* (2013.01); *H04L 67/2842* (2013.01); *H04M 1/7253* (2013.01); *G06F 16/273* (2019.01); *G06F 16/275* (2019.01); *G06F 16/278* (2019.01); *H04M 2250/10* (2013.01); *H04M 2250/12* (2013.01)

(58) Field of Classification Search
CPC .......... H04M 2250/10; H04M 2250/12; H04L 67/06; H04L 67/303; H04L 67/26; H04L 67/1095; H04L 67/2842
USPC .......................................................... 709/204
See application file for complete search history.

(56) References Cited

U.S. PATENT DOCUMENTS

| | | | |
|---|---|---|---|
| 2009/0063193 A1 | 3/2009 | Barton et al. | |
| 2009/0143056 A1* | 6/2009 | Tang | H04M 1/7253 455/418 |
| 2010/0113159 A1 | 5/2010 | Chapman et al. | |
| 2011/0029598 A1* | 2/2011 | Arnold | H04L 67/26 709/203 |
| 2011/0196925 A1* | 8/2011 | Hans | G06Q 30/02 709/204 |
| 2012/0131184 A1 | 5/2012 | Luna et al. | |
| 2013/0073389 A1 | 3/2013 | Heath | |
| 2013/0110637 A1 | 5/2013 | Bott | |
| 2013/0212420 A1 | 8/2013 | Lawson et al. | |
| 2013/0238686 A1 | 9/2013 | O'Donoghue et al. | |
| 2013/0297704 A1 | 11/2013 | Alberth, Jr. et al. | |
| 2013/0304559 A1 | 11/2013 | Stone et al. | |
| 2014/0006496 A1* | 1/2014 | Dearman | H04L 67/303 709/204 |
| 2014/0018033 A1 | 1/2014 | Luna | |
| 2014/0025524 A1 | 1/2014 | Sims et al. | |
| 2014/0031126 A1 | 1/2014 | Nguyen | |
| 2014/0047331 A1 | 2/2014 | Feldman et al. | |

OTHER PUBLICATIONS

Notice of Allowance dated May 2, 2014, U.S. Appl. No. 14/167,952 by Chan, M.A., filed Jan. 19, 2014.
Co-pending U.S. Appl. No. 14/197,121 by Chan, M.A. et al., filed Mar. 4, 2013.
Notice of Allowance dated Jun. 23, 2014 for U.S. Appl. No. 14/197,121 by Chan, M.A. et al., filed Mar. 4, 2013.
Non-Final Office Action dated Sep. 2, 2014 for U.S. Appl. No. 14/267,748 by Chan, M.A. et al., filed May 1, 2014.
Co-Pending U.S. Appl. No. 14/043,438 by Chan, M.A., filed Oct. 1, 2013.
Co-Pending U.S. Appl. No. 14/167,952 by Chan, M.A., filed Jan. 19, 2014.
Non-Final Office Action dated Feb. 10, 2015 for U.S. Appl. No. 14/043,438 by Chan, M.A., filed Oct. 1, 2013.
Xu, Z-W., et al., "The Batch Patching Algorithm Using Dynamic Cache of Proxy for Streaming Media," Proceedings of the fourth International Conference on Machine Learning and Cybernetics, vol. 9, pp. 5532-5537 (Aug. 18-21, 2005).
Yeh, L-Y., et al., "A Batch-Authenticated and Key Agreement Framework for P2P-Based Online Social Networks," IEEE Transactions on Vehicular Technology, vol. 61, No. 4, pp. 1907-1924 (May 2012).
Yu, Z. and Ji, H., "A Proxy Agent Cooperation Framework," 2010 International Conference on Computer Application and System Modeling (ICCASM), vol. 9, pp. V9-578-V9-581 (Oct. 22-24, 2010).
Notice of Allowance dated Mar. 19, 2015, for U.S. Appl. No. 14/267,748, of Chan, M.A., filed May 1, 2014.
Notice of Allowance dated Oct. 9, 2015, for U.S. Appl. No. 14/043,438, of Chan, M.A., filed Oct. 1, 2013.
Corrected Notice of Allowance dated Nov. 9, 2015, for U.S. Appl. No. 14/043,438, of Chan, M.A., filed Oct. 1, 2013.
Corrected Notice of Allowance dated Nov. 30, 2015, for U.S. Appl. No. 14/043,438, of Chan, M.A., filed Oct. 1, 2013.
Corrected Notice of Allowance dated Jan. 13, 2016, for U.S. Appl. No. 14/043,438, of Chan, M.A., filed Oct. 1, 2013.

* cited by examiner

ADJUSTING PUSH NOTIFICATIONS BASED ON LOCATION PROXIMITY

CROSS-REFERENCE TO RELATED APPLICATION(S)

This application claims to the benefit of U.S. Provisional Patent Application No. 61/708,794, entitled "CLOUD COMPUTING INTEGRATED OPERATING SYSTEM", which was filed on Oct. 2, 2012, which is incorporated by reference herein in its entirety.

TECHNICAL FIELD

Various of the disclosed embodiments relate to mobile devices, and more particularly, to facilitating pushing notifications to mobile devices based on location proximity.

BACKGROUND

There are many applications running on computing devices, e.g., mobile phones, tablet computers, laptop computers, etc., that can receive push notifications and messages from remote servers in the mobile computing device ecosystem. For instance, the Apple Push Notification Service is a push service. The Apple Push Notification Service forwards notifications from remote servers of applications to the Apple devices through a constantly open Internet Protocol (IP) connection. Such notifications can include badges, sounds or test alerts. Developers of applications can take advantages of the push service by using application programming interface (API) calls provided by Apple, Inc. The size of each notification message is usually restricted to a predetermined size, e.g. 256 bytes. Cloud-to-Device Messaging (C2DM) is a push service that allows remote servers to send messages to mobile applications on computing devices. Remote servers can use this service to notify mobile applications to contact the server and fetch updated data.

These push messaging services can create serious drains on the batteries of the computing devices, particularly for computing devices maintaining wireless network connections (e.g. WiFi or cellular networks). Every time a new message notification is pushed to a computing device, the computing device switches from a low power conservation state to a higher power consuming state for a period of time. Upon entering the higher power consuming state, the computing device remains in that state for at least a fixed time period before it can return to a low power conservation state. The higher the number of times push notifications are received longer the period the computing device remains in the higher power consuming state and the more the consumption of the battery of the computing device will be.

The current ecosystem of mobile computing devices does not consider location proximity of the computing devices for pushing the notifications. A user can have multiple mobile computing devices such as tablets and smartphones. While the user may use the smartphone more frequently or carry it more often, the user may not carry the tablet everywhere. So, the user can be away from the tablet for a longer period of time. However, the current ecosystem typically sends notifications to both the devices regardless of whether the user is near and/or likely to use the tablet. This typically results in consumption of power even when the user is not likely to use the tablet. Accordingly, current notification techniques are inefficient at least in terms of power management.

SUMMARY

Technology is disclosed for transmitting notification updates to computing devices ("the technology"). Various embodiments of the technology transmits notifications to multiple computing devices (e.g. mobile devices) based on a location proximity of the computing devices. In one such embodiment, the notifications to a particular computing device, e.g. a tablet, of a user is delayed if the user is not within a predefined location proximity to the particular computing device. A proxy server that facilitates the transmission of the notifications to the particular computing device delays or decreases the frequency of sending the notifications to the particular computing device until, e.g. the user is within the predefined location proximity to the particular computing device. The proxy server consolidates and stores all the notifications intended for that particular computing device until such time.

In some embodiments, the proximity of the user to the particular computing device can be determined based on whether a primary computing device associated with (and also present with) the user, e.g. a mobile phone such as a smartphone, is in proximity to the particular computing device. Various techniques, including a geographical location proximity, peer to peer communication techniques such as Bluetooth, NFC, WiFi, AirDrop etc. can be used to determine if the corresponding mobile devices are in close proximity.

Various embodiments of the technology transmit notifications to the computing devices based on an access pattern of the computing devices. The technology tracks an access pattern of the particular computing device by the user and predicts, using various prediction techniques, based on the historical usage data and location proximity of the computing devices whether a user is likely to use the particular computing device, e.g. at a particular time of the day, week or year, or at a particular place when the primary device is in close proximity to the particular computing device etc. If the user is not likely to use the particular computing device, the proxy server delays the transmission of the updates to the particular computing device. In some embodiments, the proxy server delays the transmission until the proxy server determines that the user is likely to use the device. In some embodiments, the proxy server may decrease the frequency of sending the notifications to the particular computing device until the proxy server determines that the user is likely to use the particular computing device. The proxy server can consolidate and store all the notifications intended for that particular computing device until such time.

A notification can include, but is not limited to, (a) a notification from an application on the primary computing device, (b) a notification from an application associated with a remote server, (c) an update to an application installed on the first computing device, or (d) a synchronization message from the primary computing device for synchronizing a state of an application between the primary computing device and the first computing device.

In some embodiments, by consolidating and transmitting the notifications when the user is in close proximity to, or likely to, use the particular computing device, the number of times the particular computing device has to switch to a high power consumption state for receiving the notifications is minimized and therefore, the power consumed by the particular computing device is also minimized.

DETAILED DESCRIPTION

Figure 1:
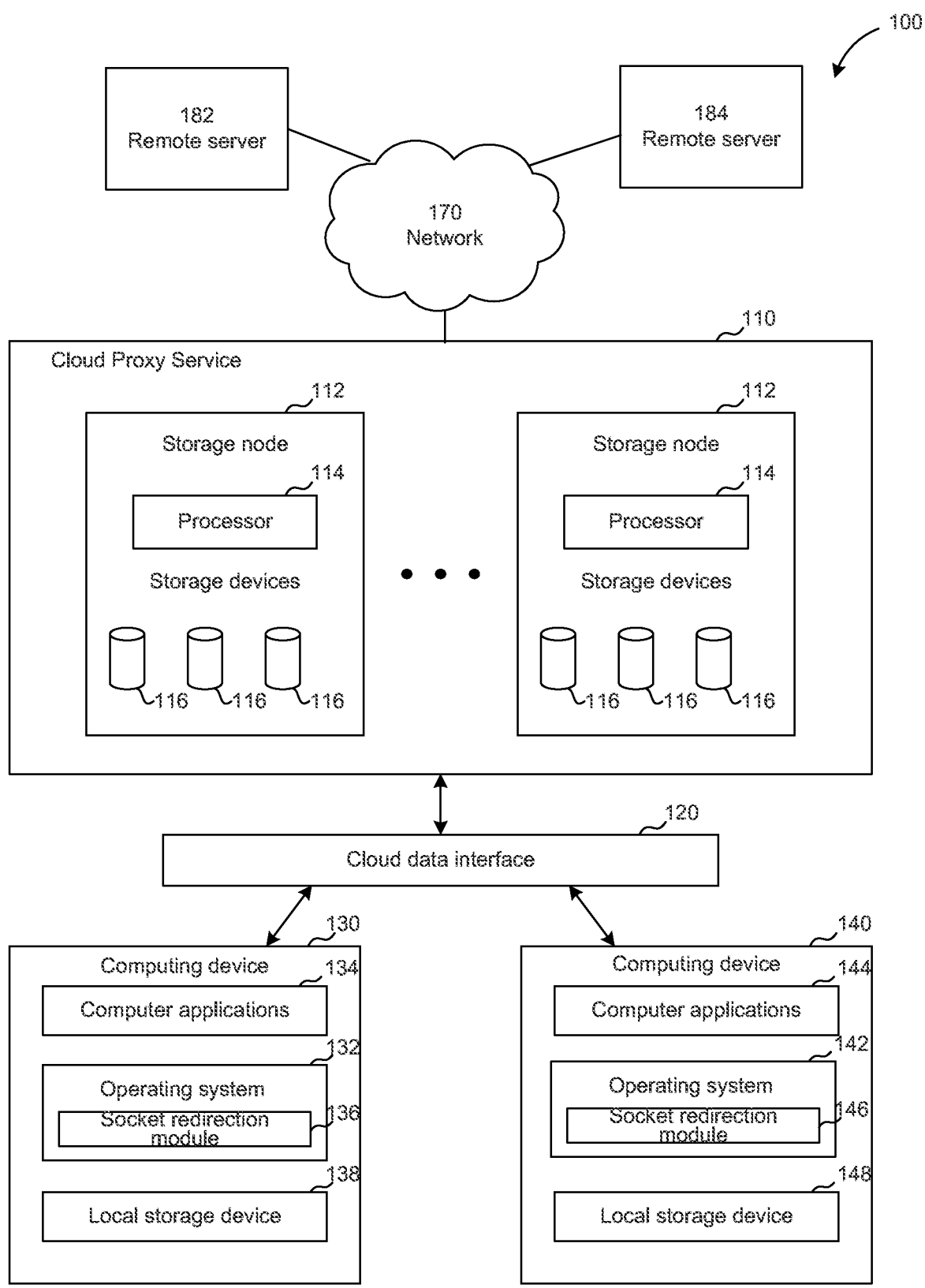
FIG. 1 illustrates a system for transmitting notifications to computing devices connected to a cloud proxy server, consistent with various embodiments.

Technology is disclosed for transmitting notification updates to computing devices ("the technology"). Various embodiments of the technology transmits notifications to multiple computing devices (e.g. mobile devices) based on a location proximity of the computing devices. In one such embodiment, the notifications to a particular computing device, e.g. a tablet, of a user is delayed if the user is not within a predefined location proximity to the particular computing device. A proxy server that facilitates the transmission of the notifications to the particular computing device delays or decreases the frequency of sending the notifications to the particular computing device until, e.g. the user is within the predefined location proximity to the particular computing device. The proxy server consolidates and stores all the notifications intended for that particular computing device until such time.

In some embodiments, the proximity of the user to the particular computing device can be determined based on whether a primary computing device associated with (and also present with) the user, e.g. a mobile phone such as a smartphone, is in proximity to the particular computing device. A primary computing device is, for example, a computing device among a number of computer devices that the user uses more often than the other computing devices. Various techniques, including a geographical location proximity, peer to peer communication techniques such as Bluetooth, NFC, WiFi, AirDrop etc. can be used to determine if the corresponding mobile devices are in close proximity.

Various embodiments of the technology transmit notifications to the computing devices based on an access pattern of the computing devices. The technology tracks an access pattern of the particular computing device by the user and predicts, using various prediction techniques, based on the historical usage data and location proximity of the computing devices whether a user is likely to use the particular computing device, e.g. at a particular time of the day, week or year, at a particular place when the primary device is in close proximity to the particular computing device etc. If the user is not likely to use the particular computing device, the proxy server delays the transmission of the updates to the particular computing device. In some embodiments, the proxy server delays the transmission until the proxy server determines that the user is likely to use the device. In some embodiments, the proxy server may decrease the frequency of sending the notifications to the particular computing device until the proxy server determines that the user is likely to use the particular computing device. The proxy server can consolidate and store all the notifications intended for that particular computing device until such time.

A notification can include, but is not limited to, (a) a notification from an application on the primary computing device, (b) a notification from an application associated with a remote server, (c) an update to an application installed on the first computing device, or (d) a synchronization message from the primary computing device for synchronizing a state of an application between the primary computing device and the first computing device.

In some embodiments, by consolidating and transmitting the notifications when the user is in close proximity to, or likely to, use the particular computing device, the number of times the particular computing device has to switch to a high power consumption state for receiving the notifications is minimized and therefore, the power consumed by the particular computing device is also minimized.

Environment

FIG. 1 illustrates a system 100 for transmitting notifications to computing devices connected to a cloud proxy service, consistent with various embodiments. The system 100 includes a cloud proxy service 110 configured to handle communications between the computing devices 130-140 and remote servers 182-184. In one embodiment, the cloud proxy service 110 can be a server cluster having computer nodes interconnected with each other by a network. The server cluster can communicate with remote servers 182-184 via the Internet. The cloud proxy service 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A cloud data interface 120 can also be included to receive data from and send data to computing devices 130-140. The cloud data interface 120 can include network communication hardware and network connection logic to receive the information from computing devices. The network can be a local area network (LAN), wide area network (WAN) or the Internet. The cloud data interface 120 may include a queuing mechanism to organize data update received from or sent to the computing devices 130 and 140.

In some embodiments, any communication (a) between the remote servers 182-184 and the computing devices 130-140 and (b) between the computing devices 130-140 are routed through the cloud proxy service 110. For example, notifications to the computing devices 130-140 are routed through cloud proxy service 110. The notifications can be generated by the remote servers 182-184 for any of the computing devices 130-140 or by any of the computing devices 130-140 for one or more of many computing devices. In one example, the cloud proxy service 110 transmits the notifications generated by and received from the remote servers 182-184 to the appropriate computing devices. In another example, the cloud proxy service 110 transmits the notifications generated by one of the computing devices 130 or 140 for one or more of many computing devices to the one or more of the many computing devices.

In yet another example, in an environment where the computing devices 130-140 can communicate with each other directly using a peer to peer communication technique, e.g. Bluetooth, the cloud proxy service 110 facilitates the computing devices 130-140 to communicate directly for sending/receiving the notifications. In some embodiments, while the computing devices 130 and 140 send/receive the notifications directly, the cloud proxy service 110 may also obtain a copy of the notifications.

Although FIG. 1 illustrates two computing devices 130 and 140, a person having ordinary skill in the art will readily understand that the technology disclosed herein can be applied to a single computing device or more than two computing devices connected to the cloud proxy service 110.

The computing devices 130-140 include an operating system 132-142 to manage the hardware resources of the computing devices 130-140 and provide services for running computer applications 134-144 (e.g., mobile applications running on mobile devices). The operating system 132-142 facilitates execution of the computer applications 134-144 on the computing device 130-140. The computing devices 130-140 include at least one local storage device 138-148 to store the computer applications 134-144 and user data. The computing device 130 or 140 can be a desktop computer, a laptop computer, a tablet computer, an automobile computer, a game console, a smartphone, a personal digital assistant, or other computing devices capable of running computer applications, as contemplated by a person having ordinary skill in the art.

The computer applications 134-144 stored in the computing devices 130-140 can include applications for general productivity and information retrieval, including email, calendar, contacts, and stock market and weather information. The computer applications 134-144 can also include applications in other categories, such as mobile games, factory automation, GPS and location-based services, banking, order-tracking, ticket purchases or any other categories as contemplated by a person having ordinary skill in the art.

The operating system 132-142 of the computing devices 130-140 includes socket redirection modules 136-146 to redirect network messages. The computer applications 134-144 generates and maintains network connections directed to various remote servers, e.g. remote servers 182 and 184. Instead of directly opening and maintaining the network connections with these remote servers, the socket redirection modules 136-146 routes all of the network messages for these connections of the computer applications 134-144 to the cloud proxy service 110. The cloud proxy service 110 is responsible to open and maintain network connections with the remote servers 182 and 184.

All or some of the network connections of the computing devices 130-140 are through the cloud proxy service 110. The network connections can include Transmission Control Protocol (TCP) connections, User Datagram Protocol (UDP) connections, or other types of network connections based on other protocols. When there are multiple computer applications 134-144 that need network connections to multiple remote servers, the computing devices 130-140 only needs to maintain one network connections with the cloud proxy service 110. The cloud proxy service 110 will in turn maintain multiple connections with the remote servers on behalf of the computer applications 134-144.

The cloud proxy service 110 can connect to the remote servers 182 and 184 via a network 170. The network 170 can be, for example, the Internet, a metropolitan area network (MAN), a wide area network (WAN), a LAN, or any other type of network or combination of networks.

In some embodiments, the cloud proxy service 110 can control transmission of notifications to the computing devices 130-140 based on at least one of a location proximity of the computing devices 130-140 or an access pattern of the computing devices 130-140 by a user of the computing devices 130-140. The controlling of transmission can include delaying the transmission or decreasing the frequency of transmission of the notifications to one or more of the computing devices 130-140 if the one or more of the computing devices 130-140 are not in predefined range of location proximity or if the one or more of the computing devices 130-140 is not likely to be accessed by the user. This helps in minimizing the number of times the notifications are transmitted to the computing devices 130-140 and therefore, in minimizing the usage of power of the computing devices 130-140. The cloud proxy service 110 can maintain data relating to the location or the access pattern of the computing devices 130-140 and use the data to control the way of transmitting notifications to the computing devices 130-140 efficiently. Additional details with respect to transmission of notifications based on location proximity and/or access pattern are described at least with reference to FIGS. 2-7.

Figure 2:
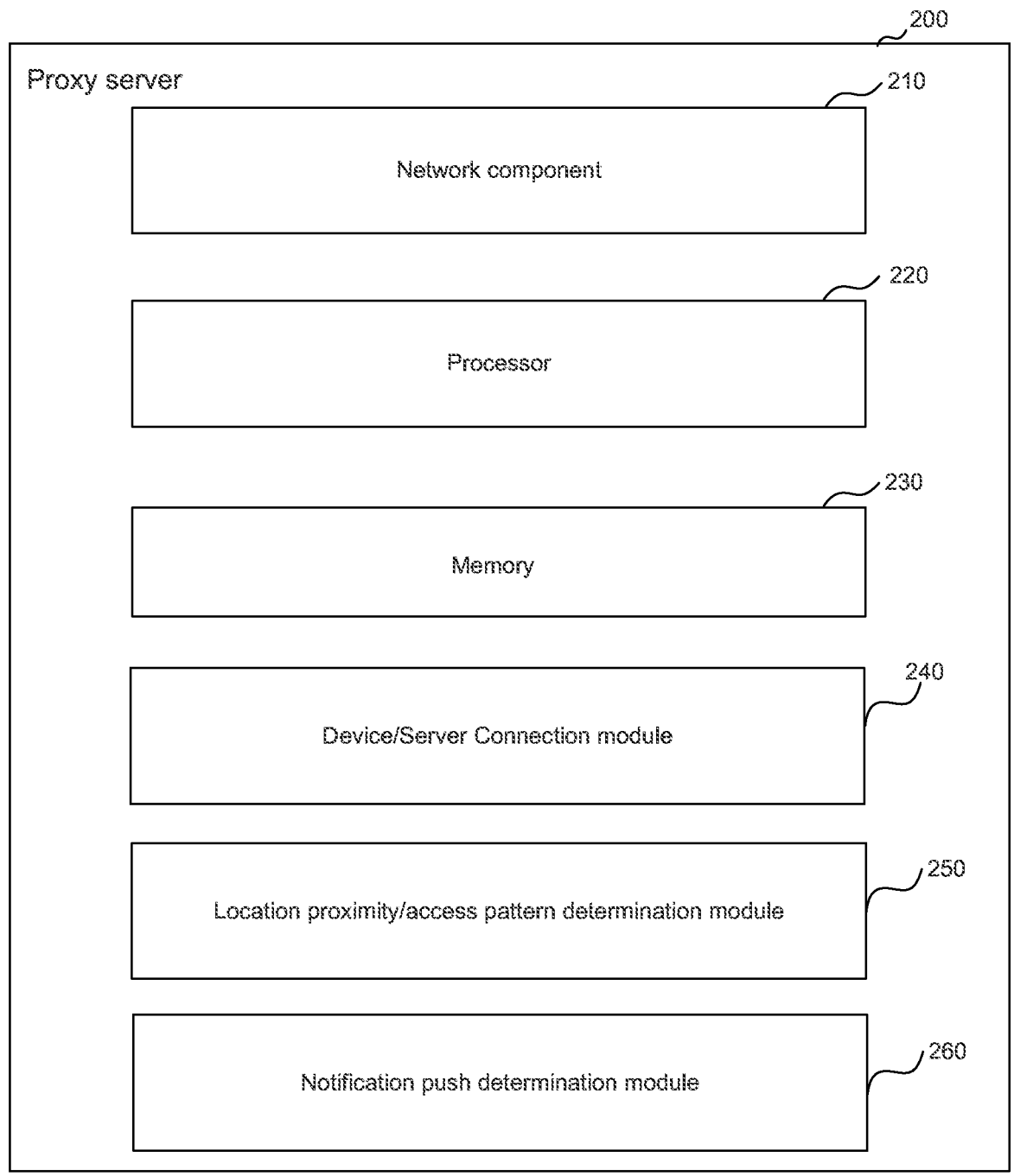
FIG. 2 illustrates a block diagram of a proxy server that controls transmission of notifications based on location proximity and/or access pattern of the computing devices, consistent with various embodiments.

FIG. 2 illustrates a block diagram of a proxy server 200 that controls transmission of notifications to computing devices based on a location proximity of the computing devices, consistent with various embodiments of the disclosed technique. In some embodiments, the proxy server 200 can be a server that provides the cloud proxy service 110 of FIG. 1. The proxy server 200 can be, e.g., a dedicated standalone server, or implemented in a cloud computing service. The proxy server 200 includes a network component 210, a processor 220, a memory 230, a device/server connection module 240 (hereinafter simply "device connection module 240"), a location proximity/access pattern determination module 250 (hereinafter simply "location proximity determination module 250") and a notification push determination module 260. The memory 230 can include instructions which when executed by the processor 220 enables the proxy server 200 to perform the functions as described with reference to cloud proxy service 110. The networking component 210 is configured for network communications, including notifications, with computing devices and remote servers, e.g. as shown in FIG.1. In some embodiments, the proxy server 200 can include multiple network components for network communications with different computing devices and remote servers.

The device connection module 240 establishes a device network connection with a computing device, and a server network connection with a remote server in response to a request from the computing device for connecting with the remote server. The request can be generated by a computer application running at the computing device. The device connection module 240 can maintain multiple server network connections with multiple remote servers as a proxy of one or more computer applications of the computing devices.

As explained above, the transmission of notifications to the computing devices can be controlled based on at least one of a location proximity of the computing devices or an access pattern of the computing devices by a user of the computing devices. In some embodiments, the location proximity determination module 250 determines the location proximity as a function of the geographical location proximity of two or more computing devices, e.g. a primary computing device and a secondary computing device of a user. In some embodiments, a primary computing device is one of the multiple computer devices associated with the user which the user uses more often than the other computing devices. The geographical location of the device can be determined using various means, such as Global Positioning System (GPS), installed on the device, cellular towers the device is in communication with, IP address, through an application installed on the device that has location details of the device etc.

In some embodiments, the geographical location proximity can be determined as a function of distance between two or more computing devices. In some embodiments, the geographical location proximity can be determined as a function of time between two or more computing devices. For example, consider that devices, e.g. primary computing device "A" and secondary computing device "B," are at different geographical locations "X" and "Y," respectively, which are "30 miles" apart. Further, consider that it takes approximately "45 minutes" to travel, e.g. by road/rail/air/walk etc., between the locations "X" and "Y". The geographical location proximity of the devices "A" and "B" as a function of distance is determined as "30 miles" and as a function of time is determined can be "45 minutes." The geographical location proximity "30 miles" signifies that the user having the device "A" is "30 miles" from where the device "B" is. Similarly, the geographical location proximity "45 minutes" signifies that the user having the device "A" can take approximately "45 minutes" to reach the location where the device "B" is. Various other functions may be used in determining the geographical location proximity.

The notification push determination module 260 determines whether the primary computing device and the secondary computing device are within a predefined location proximity range for facilitating transmission of the notifications to the secondary computing device. In some embodiments, the closer the computing devices are higher is the frequency with which the notifications are transmitted, and farther the computing devices are lower is the frequency with which notifications are transmitted. For example, for a location proximity range of "5 mins-10 mins," the transmission rate of notifications can be per minute, for the location proximity range of "20 mins-30 mins," the transmission rate of notifications can be per five (5) minutes, and for a location proximity range of "5 miles-10 miles," the transmission rate of notifications can be per minute etc. That is, farther the devices are lower is the frequency at which the notifications are transmitted. This can help save the battery life of the secondary computing device by minimizing the number of times the notifications are sent to the secondary computing device while the device is not being used by the user.

Regarding the transmission of notifications to the primary computing device, in some embodiments, since the primary computing device is used by the user more often than the other devices, the proxy server 200 transmits the notifications to the primary computing device without any delay. In some other embodiments, the notifications may sent to the primary computing device if the device is active, e.g. displayed is turned on or the user is interacting with the device.

In an embodiment, the predefined location proximity ranges and their corresponding transmission frequencies can be configured by a user of the computing device or other entities such as a provider or an administrator of the proxy server 200.

Consider a scenario where computing devices such as a mobile phone and a tablet are associated with a user. The user carries the mobile phone everywhere the user goes but uses the tablet generally when at home. For example, the user may carry the mobile phone to work every day but may leave the tablet at home. The mobile phone can be considered as a primary computing device associated with the user since the user uses the mobile phone more frequently or more often than the tablet. The user can receive notifications on his mobile phone and tablet from various services or applications such as Facebook, Google+, or from any other application installed on the mobile phone and the tablet of the user. In some embodiments, the notifications can also include notifications generated by the mobile phone for the tablet or vice versa, for example, a file update notification, or a game notification.

Consider that the tablet is at home and the mobile phone is with the user at his office and the user takes 30 minutes to reach home from office. When the proxy server 200 receives notifications generated for the user by various sources, the proxy server 200 transmits (e.g. via the network component 210) the notifications to the mobile phone without any delay. However, with respect to the tablet, the proxy server 200 determines whether the tablet is in a predefined location proximity range. The location proximity determination module 250 determines that the tablet is 30 minutes away from the mobile phone. Accordingly, the notification push determination module 260 refers to the predefined location proximity ranges and determines the frequency of transmission of the notifications to the tablet. The frequency of transmission for "30 minutes" location proximity range can be, for example, "every 5 minutes." Accordingly, the proxy server 200 delays the transmission of notifications to the tablet until the next transmission interval. The proxy server 200 stores all the notifications that are received for the tablet until they are transmitted.

In some embodiments, the location proximity determination module 250 determines the location proximity between the mobile phone and the tablet using peer to peer communication techniques such as Bluetooth, NFC, WiFi, AirDrop etc. If the mobile phone and the tablet are able to communicate using the peer to peer communication techniques, the notification push determination module 260 determines that the devices are in close proximity and therefore, may determine that the notifications may be transmitted without any delay or at an increased frequency. Further, the proxy server 200 can also facilitate the devices to send/receive the notifications directly from the other devices using the peer to peer communicate techniques.

In some embodiments, if the mobile phone and the tablet are sharing a common communication network, such as a wireless network, the notification push determination module 260 determines that the devices are in close proximity.

In some embodiments, the proxy server 200 also considers an access pattern of the computing devices by the user in addition to or instead of location proximity of the computing devices for controlling the transmission of the notifications to the computing devices. The location proximity determination module 250 tracks an access pattern of a particular computing device by the user to generate historical usage data. The historical data can include a particular time of the day, week or year the user accessed the particular computing device and the duration for which the user accessed the particular computing device, the applications accessed, a particular location where the particular computing device was accessed, a location proximity of the primary computing device when the computing device was accessed, etc. The access data can also include factors such as weather when the particular computing device was accessed.

In some embodiments, the access data can also include usage or non-usage statistics of the particular tablet at times when certain external events occur, such as telecast of particular television shows, during which the particular computing device was not accessed. Such data can be used to predict scenarios where the user may be not likely to use the computing device at a time and for a period a particular show is telecasted.

The notification push determination module 260 predicts based on the historical usage data and the location proximity range of the mobile devices as to whether a user is likely to use a particular computing device (primary or non-primary), e.g. at a particular time of the day, week or year, at a particular place when the primary device is in close proximity to the particular mobile device etc. If the user is not likely to use the particular computing device, the proxy server 200 delays the transmission of the updates to the particular computing device. In some embodiments, the proxy server delays the transmission until the proxy server determines that the user is likely to use the device.

The notification push determination module 260 predicts the access data of the devices by the user using various means, including machine learning techniques, artificial intelligence, third party services, applications, products etc. Alternatively or additionally, the notification push determination module 260 may also consider the access pattern of various other users to determine various trends in the access pattern of the computing devices based on which the access pattern for a particular user and a particular device can be predicted. It can also consider access pattern of a certain group of users, e.g. users from a city, country, users of a particular job type, roles etc. Various such techniques can be used to optimize the predicted data for higher accuracy.

For example, consider the above scenario where the user carries the mobile phone with him to work while the tablet is left behind at home. The user typically accesses or uses the tablet when the user is back home from work. The location proximity determination module 250 tracks data such as the time of the day the tablet is accessed, the time of the day user starts from work to home, the time taken to reach home, etc. In some embodiments, the location proximity determination module 250 determines such data by tracking the location of the mobile phone the user is carrying. The location of the mobile device is determined using various means, including GPS, from applications installed on the computing device that has current location details etc.

Based on the historical data tracked by the location proximity determination module 250, the notification push determination module 260 may determine that the user typically uses the tablet every day at "6 pm," the user starts for work at "7 am," starts for home at "5 pm" and takes "45 minutes" to reach home. Accordingly, the notification push determination module 260 may determine that any notifications received for the tablet after "7 am" in the morning can be, for example, delayed until "5 pm." All notifications that are received at the proxy server 200 for the tablet can be stored by the proxy server 200 until such time. The proxy server 200 starts transmitting the notifications from "5 pm" and increases the frequency as the user is reaching home.

Figure 3:
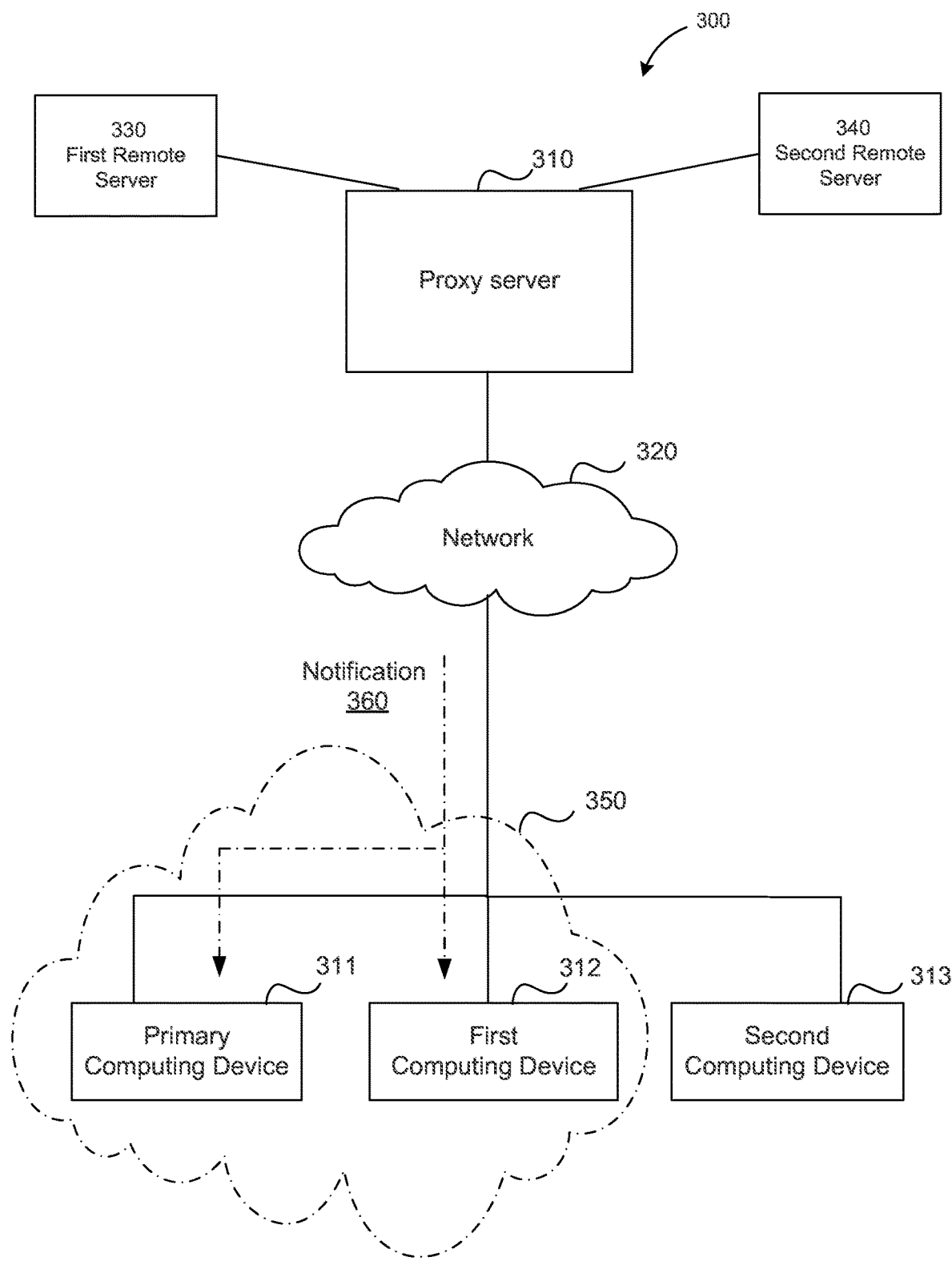
FIG. 3 illustrates an example of a system for transmitting notifications from a remote server to computing devices based on a location proximity of the computing devices, consistent with various embodiments.
Figure 4:
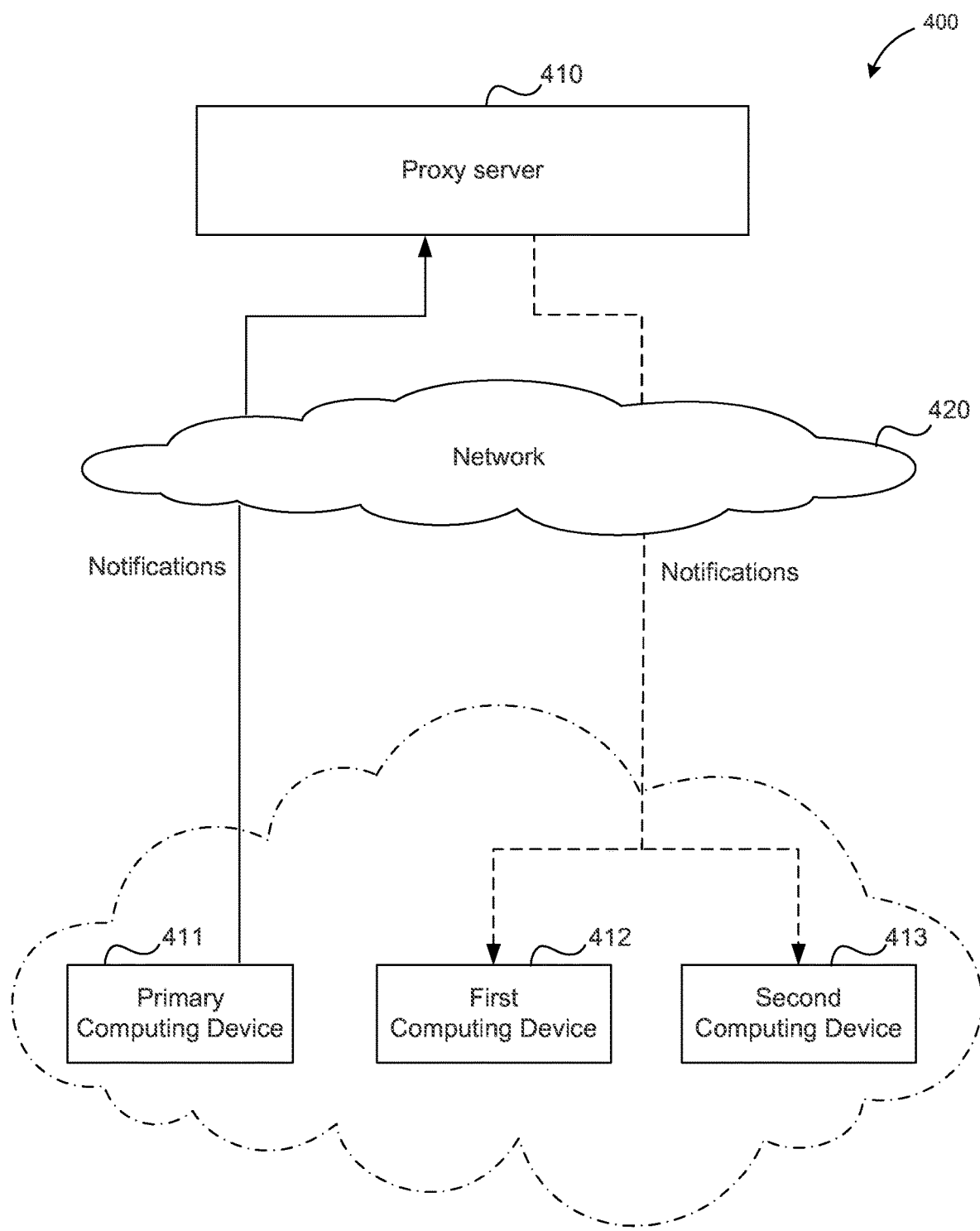
FIG. 4 illustrates an example of a system for transmitting notifications from a primary computing device of a user to other computing devices associated with the user based on a location proximity of the computing devices, consistent with various embodiments.
Figure 5:
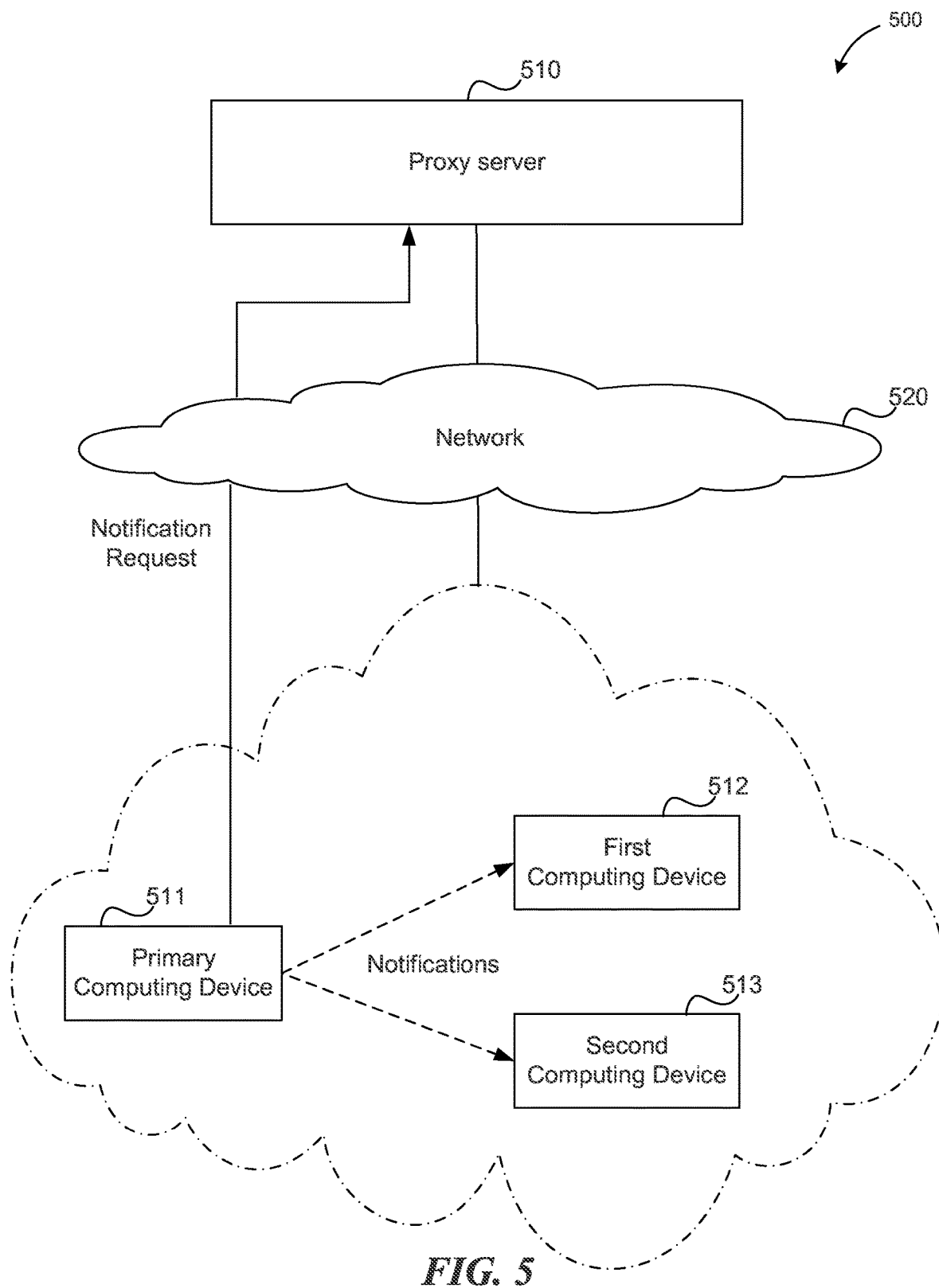
FIG. 5 illustrates another example of a system for transmitting notifications from a primary computing device of a user to other computing devices associated with the user directly based on a location proximity of the computing devices, consistent with various embodiments.

Various examples for transmitting notifications to computing devices based on location proximity is described at least with reference to FIGS. 3-5.

FIG. 3 illustrates an example of a system for transmitting notifications from a remote server to computing devices based on a location proximity and/or access pattern of the computing devices, consistent with various embodiments of the disclosed technology. In some embodiments, the system 300 can be similar to the system 100 of FIG. 1. The system 300 includes a proxy server 310 that can provide cloud proxy service 110. The system 300 also includes remote servers such as a first remote server 330 and a second remote server 340 that generate notifications for the computing devices associated with a user, including a primary computing device 311, a first computing device 312 and a second computing device 313.

The remote servers can include information publishers, social media applications such as Facebook, Google+, etc., or any applications or third party services that can send notifications to the computing devices. The computing devices communicate with the proxy server 310 and the remote servers over a communication network 320. In some embodiments, the computing devices can be one or more of a mobile phone, a tablet, a desktop, a laptop, a tablet, a gaming device, etc. Typically, a user can have multiple computing devices. In some embodiments, a primary computing device is a computing device that the user uses more often than the other computing devices. For example, in a scenario where the user carries the mobile phone to work every day but leaves the tablet at home, the mobile phone is considered to be a primary computing device of the user since the user can potentially use the mobile phone more frequently and more often than the tablet. In some embodiments, the proxy server 310 may determine which of the computing devices associated with the user is a primary computing device, e.g. based on the access pattern of the computing device. In some embodiments, the proxy server 310 may determine a computing device which is currently active, e.g. if the user is currently using the computing device or if the display of the computing device is on, as a primary computing device. In some embodiments, the user may specify (e.g. via a user interface such as a user profile user interface) which of the computing devices is a primary computing device.

Consider a scenario where the primary computing device 311 is with the user in his office headquarters, the first computing device 312 is at another office one block away from the headquarters and the second computing device 313 is home which is "60 minutes" away. Further, consider that the location proximity range 350 to facilitate transmission of notifications is set, e.g. by an entity such as an administrator of proxy server 310, as "10 minutes." That is, notifications are transmitted without any delay to computing devices in the proximity of "10 minutes" from the primary computing device 311.

In the system 300, the first remote server 330 generates a notification 360, e.g. a status update from a social network, for the user. The proxy server 310 identifies the primary computing device 311 of the user and transmits the notification 360 to the primary computing device 311. The proxy server 310 determines whether the first computing device 312 and the second computing device 313 are within a predefined location proximity range 350 from the primary computing device 311 for transmission of the notification 360. The proxy server 310 determines that the first computing device 312 is within the predefined location proximity range and therefore, transmits the notification 360 to the first computing device 312 without any delay. In some embodiments, the proxy server 310 may transmit the notification 360 according to a frequency defined for the particular location proximity range.

Regarding the second computing device 313, the proxy server 310 determines that the second computing device 312 is not within the predefined location proximity range from the primary computing device 311. Accordingly, the proxy server 310 may delay the transmission of the notification 360 to the second computing device 313. The proxy server 310 may store all the notifications for later transmission. In some embodiments, the proxy server 310 may transmit the notification 360 to the second computing device 313 when the second computing device 313 is in the predefined location proximity range. For example, when the user starts from work towards home, the proxy server 310 may start transmitting the notification 360 to the second computing device 313 when the user (e.g. primary computing device 311 associated with the user) is within "10 minutes" from home. The proxy server 310 may determine when to transmit the notification 360 either based on the location proximity between the primary computing device 311 and the second computing device 313 or based on the access pattern of the second computing device 313.

In some embodiments, the notifications can be generated by the primary computing device 311. FIG. 4 illustrates an example of a system 400 for transmitting notifications from one computing device of a user to other computing devices of the user based on a location proximity and/or access pattern of the computing devices, consistent with various embodiments of the disclosed technology. The notifications can include data such as changes in a state of an application, e.g. user entering a new stage in a game, addition of a new photo to the user's photo library, changes in user account settings etc. that may have to be synchronized on all the computing devices of the user. In some embodiments, in the system 400, a proxy server 410, a primary computing device 411, a first computing device 412 and a second computing device 413 can be similar to the proxy server 310, the primary computing device 311, the first computing device 312 and the second computing device 313, respectively.

In the system 400, consider that all the computing devices are within the predefined location proximity range (which is determined, for example, as described with reference to FIG. 2 or 3). The primary computing device 411 generates a notification and sends it to the proxy server 410 for transmitting to the other computing devices associated with the user. The proxy server 410 identifies the other computing devices, the first computing device 412 and the second computing device 413, as being within predefined location proximity range of the primary computing device 411 and transmits the notifications to the first computing device 412 and the second computing device 413. The proxy server 410 transmits the notifications without any delay or according to a frequency defined for the particular location proximity range. The proxy server 410 transmits the notifications via the network 420.

In the system 400, the primary computing device 411 transmits the notifications to the first computing device 312 and the second computing device 313 via the proxy server 410. In some embodiments, the primary computing device 411 can transmit the notifications to one or more of the computing devices directly. FIG. 5 illustrates an example of a system for transmitting notifications from a primary computing device of a user to other computing devices associated with the user directly and based on a location proximity of the computing devices, consistent with various embodiments of the disclosed technology.

In some embodiments, in the system 500, the proxy server 510, a primary computing device 511, a first computing device 512 and a second computing device 513 can be similar to the proxy server 310, the primary computing device 311, the first computing device 312 and the second computing device 313, respectively of FIG. 3. As explained above, at least with reference to FIG. 2, the proxy server 510 can determine whether the computing devices are in close proximity by determining whether the devices can communicate directly, for example, using peer to peer communication techniques such as Bluetooth, WiFi (or WiFi direct), AirDrop, Infrared, NFC etc. In some embodiments, the proxy server 510 also determines whether the computing devices are in close proximity by determining whether the computing devices share a common communication network, e.g. a wireless network such as a home WiFi network.

In the system 500, the proxy server 510 determines that the first computing device 512 and the second computing device 513 are in close proximity to the primary computing device 511 and can all communicate with each other directly. Accordingly, when the primary computing device 511 sends a notification request to the proxy server 510 requesting it to transmit the notifications to the other computing devices associated with the user, the proxy server 510 responds to request by asking the primary computing device 511 to communicate with the first computing device 512 and the second computing device 513 directly. The primary computing device 511 may then transmit the notifications to the first computing device 512 and the second computing device 513 directly using any of the various peer to peer communication techniques. In some embodiments, though the primary computing device 511 transmits the notifications to the other computing devices directly, a copy of the notification may also be transmitted to the proxy server 510. Further, in some embodiments, the direct communication between the computing devices is controlled by the proxy server 510. That is, the computing devices may not communicate directly unless permitted by the proxy server 510.

Figure 6:
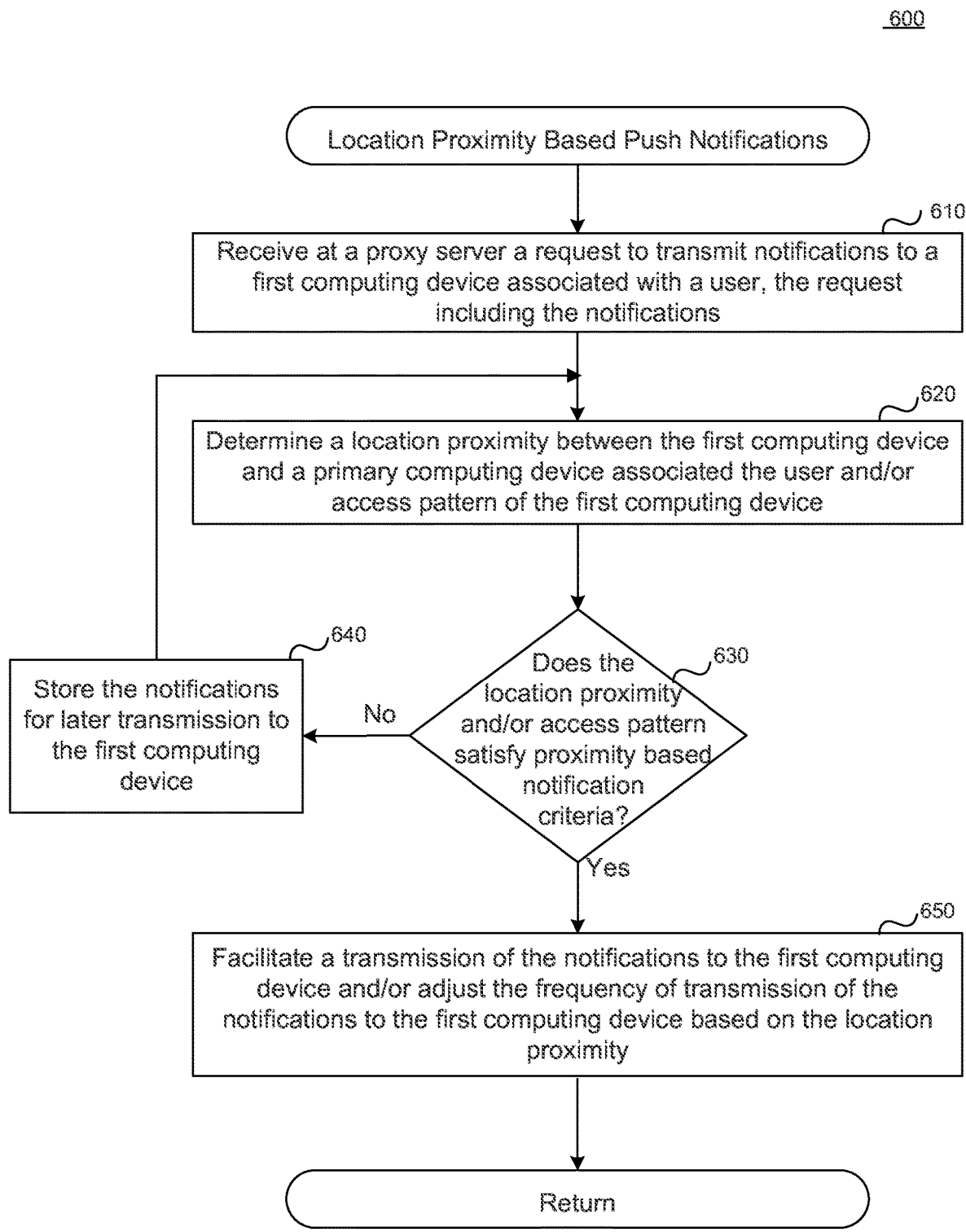
FIG. 6 illustrates a flow diagram for transmitting notifications to computing devices based on location proximity between the computing devices and/or access pattern of the computing devices, consistent with various embodiments.

FIG. 6 illustrates a flow diagram for transmitting notifications to computing devices based on location proximity between the computing devices and/or access pattern of the computing devices, consistent with various embodiments. The process 600 can be implemented in a system such as system 100 of FIG. 1 and using a server that provides cloud proxy service 110, such as proxy server 200 of FIG. 2. A user can typically have multiple computing devices. One of the computing devices can be considered as a primary computing device of the user, for example, a device which the user uses more often or frequently than the others. So, when the notifications are generated for the user, the notifications have to be transmitted to all the computing devices associated with the user. At step 610, the proxy server 200 receives a request to transmit notifications to a first computing device associated with a user. The request can also include the notifications that have to be transmitted.

At step 620, the proxy server 200 determines a location proximity between the first computing device and the primary computing device of the user. In some embodiments, the proxy server 200 determines the location proximity as a function of the geographical location proximity of the primary computing device and the first computing device. The geographical location of the device can be determined using various means, such as Global Positioning System (GPS) installed on the device, cellular towers the device is in communication with, IP address etc. The geographical location proximity can be determined in terms of distance, time etc. An example of geographical location proximity of devices "A" and "B" which are at locations "X" and "Y," respectively, in terms of distance can be "30 miles," which indicates that the devices are 30 miles apart, and in terms of time can be "45 minutes," which indicates that user using the primary computing device "A" at a location "X" may take "45 minutes" to reach location "Y" by walk/road/rail/air etc.

In some embodiments, the proxy server 200 determines the location proximity between the primary computing device and the first computing device using peer to peer communication techniques such as Bluetooth, NFC, WiFi, AirDrop etc. If the devices are able to communicate directly, then they may be considered to be in close proximity.

Referring back to step 620, in addition to or instead of the location proximity of the devices, the proxy server 200 can determine an access pattern of the first computing device to determine whether when the user is likely to access to the first computing device. At step 630, the proxy server 200 determines whether the location proximity or the access pattern of the first computing device satisfies the proximity based notification criteria. The proximity based notification criteria can include location proximity ranges and the access pattern information (which is described above with reference to FIG. 2). In some embodiment the proximity based notification criteria can be set by an entity such as an administrator of the proxy server 200.

Responsive to a determination that the proximity based notification criteria is not satisfied, at step 640, the notifications are stored by the proxy server 200 for later transmission and the control is transferred to step 620. On the other hand, responsive to a determination that the proximity based notification criteria is satisfied, at step 650, the proxy server 200 facilitates the transmission of the notifications to the first computing device without delay. While the proxy server 200 transmits the notifications without any delay, in some embodiments, a frequency of the transmission of the notifications is adjusted based on the location proximity and/or access pattern. For example, as the primary computing device moves closer to the first computing device, the frequency of transmission of the notifications may be increased and while the primary computing device moves farther from the first computing device, the frequency of transmission of the notifications may be decreased.

Figure 7:
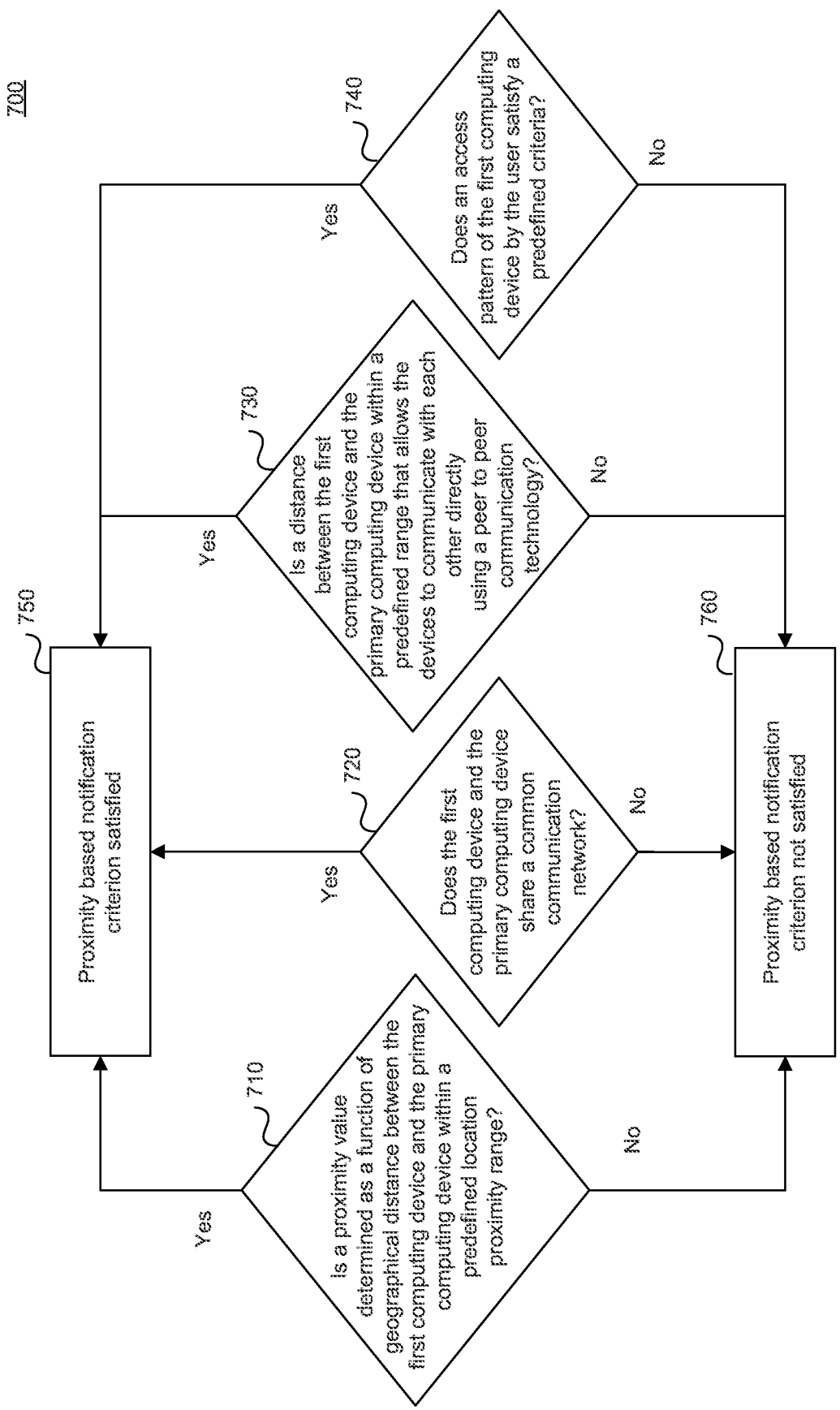
FIG. 7 illustrates an example process for determining whether the proximity based notification criteria as determined in FIG. 6 is satisfied, consistent with various embodiments.

Referring back to step 630, the determination of whether the proximity based notification criteria is satisfied is illustrated with reference to FIG. 7. In the example process 700 of FIG. 7, at determination step 710, the proxy server 200 determines whether a proximity value determined as a function of geographical distance between the first computing device and the primary computing device is within a predefined location proximity range. If yes, the proxy server 200 determines that the proximity based notification criteria is satisfied (750). If no, the proxy server 200 determines that the proximity based notification criteria is not satisfied (760).

At determination step 720, the proxy server 200 determines whether the first computing device and the primary computing device share a common communication network. If yes, the proxy server 200 determines that the proximity based notification criteria is satisfied (750). If no, the proxy server 200 determines that the proximity based notification criteria is not satisfied (760).

At determination step 730, the proxy server 200 determines whether the distance between the first computing device and the primary computing device is within a range that allows the devices to communicate with each other directly using a peer to peer communication technology. If yes, the proxy server 200 determines that the proximity based notification criteria is satisfied (750). If no, the proxy server 200 determines that the proximity based notification criteria is not satisfied (760).

At determination step 740, the proxy server 200 determines whether the access pattern of the first computing device by the user satisfy a predefined criteria. For example, whether the user is likely to use the first computing device at a particular time etc. If yes, the proxy server 200 determines that the proximity based notification criteria is satisfied (750). If no, the proxy server 200 determines that the proximity based notification criteria is not satisfied (760).

It should be noted that determination steps 710-740 may be executed in any order.

Figure 8:
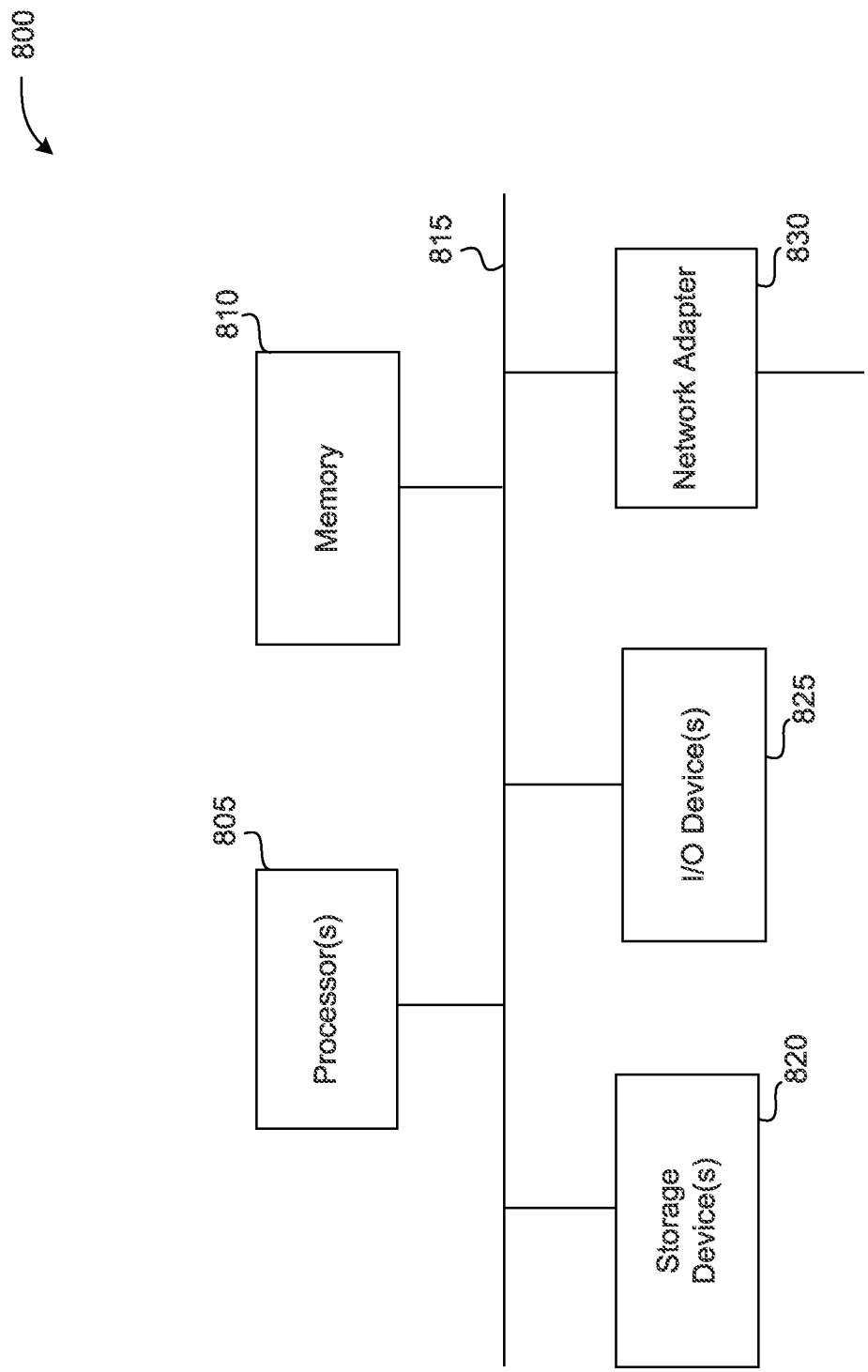
FIG. 8 is a block diagram of a computer system as may be used to implement features of some embodiments of the disclosed technology.

FIG. 8 is a block diagram of a computer system as may be used to implement features of some embodiments of the disclosed technology. The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 810 and storage devices 820 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the invention. Accordingly, the invention is not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method of transmitting notifications using a proxy server, the method comprising:
   receiving, at the proxy server, a request from an originating device to transmit the notifications to a first computing device associated with a user, the request including the notifications;
   determining, by the proxy server, a location proximity between the first computing device and a primary computing device, the primary computing device being most frequently accessed by the user amongst a plurality of computing devices associated with the user, the primary computing device being different from the originating device that generates the notifications;
   determining, by the proxy server, whether the location proximity between the first computing device and the primary computing device satisfies a proximity based notification criterion; and
   responsive to a determination that the location proximity between the first computing device and the primary computing device satisfies the proximity based notification criterion, facilitating, by the proxy server, a transmission of the notifications to the first computing device via a cloud data interface,
   wherein the cloud data interface comprises a queuing mechanism to organize one or more data updates received from or sent to the plurality of computing devices,
   wherein facilitating the transmission of the notifications to the first computing device comprises increasing a frequency of the transmission when a location proximity range between the primary computing device and the first computing device decreases, and decreasing the frequency of the transmission when the location proximity range increases, wherein the increasing of the frequency of the transmission when the location proximity range decreases comprises transmitting the notification at a first transmission frequency that is greater than zero when the location proximity is at a first location proximity range, and transmitting the notification at a second transmission frequency that is greater than the first transmission frequency when the location proximity is at a second location proximity range that is less than the first location proximity range.

2. The method of claim 1 further comprising:
   responsive to a determination that the location proximity between the first computing device and the primary device does not satisfy the proximity based notification criterion, storing, by the proxy server, the notifications for later transmission to the first computing device.

3. The method of claim 2 further comprising:
   facilitating, by the proxy server, the transmission of the stored notifications to the first computing device when the location proximity between the first computing device and the primary computing device satisfies the proximity based notification criterion.

4. The method of claim 1, wherein determining whether the location proximity satisfies the proximity based notification criterion includes determining whether a proximity value determined as a function of geographical distance between the first computing device and the primary device is within a predefined range.

5. The method of claim 1, wherein determining whether the location proximity satisfies the proximity based notification criterion includes determining whether the first computing device and the primary computing device share a common communication network.

6. The method of claim 5, wherein the common communication network includes a wireless network.

7. The method of claim 1, wherein determining whether the location proximity satisfies the proximity based notification criterion includes determining whether a distance between the first computing device and the primary computing device is within a predefined range that allows the first computing device and the primary computing device to communicate with each other directly using a peer to peer communication technology.

8. The method of claim 7, wherein the peer to peer communication technology includes at least one of (a) Bluetooth, (b) WiFi direct, (c) Near field communication (NFC), (d) AirDrop, or (e) Infrared.

9. The method of claim 1, wherein the primary computing device associated with the user includes a computing device that is being used by the user at a given instance.

10. The method of claim 1, wherein the originating device is a remote server different from the proxy server.

11. The method of claim 1, wherein the originating device is one or more computing devices associated with the user different from the first computing device.

12. The method of claim 11, wherein facilitating a transmission of the notifications to the first computing device includes facilitating, by the proxy server, the primary computing device to transmit the notifications to the first computing device directly.

13. The method of claim 1, wherein determining the location proximity between the first computing device and the primary computing device associated the user includes determining a first location of the first computing device and a second location of the primary device.

14. The method of claim 13, wherein determining the first location includes determining a geographical location of the first computing device via at least one of (a) a global positing system (GPS) device on the first computing device or (b) an application installed on the first computing device that has data specifying the geographical location of the first computing device.

15. The method of claim 1, wherein the notifications include at least one of (a) a notification from an application associated with a remote server, or (b) an update to an application installed on the first computing device.

16. The method of claim 1, wherein the proximity based notification criterion is determined based on an access pattern of the first computing device by the user, wherein determining the access pattern of the first computing device includes determining the access pattern of the first computing device in relation to an occurrence of an event that is not associated with the first computing device.

17. The method of claim 16, wherein determining the access pattern of the first computing device includes tracking data specifying at least one of (a) a time of the day, (b) a day of the week, (c) a time of the month, (d) a time of the year, or (e) a period for which the first computing device is accessed by the user to generate historical access data.

18. The method of claim 17 further comprising:
predicting, based on the historical access data, access data specifying at least one of (a) a time of the day, (b) a day of the week, (c) a time of the month, (d) a time of the year, or (e) a period for which the first computing device is likely to be accessed by the user.

19. The method of claim 18 further comprising:
facilitating the transmission of the notifications based on the predicted access data.

20. A non-transitory computer readable medium having instructions which, when executed by a processor, performs a method of:
receiving at a proxy server a request from an originating device to transmit notifications to a first computing device associated with a user, the request including the notifications;
determining by the proxy server a location proximity between the first computing device and a primary computing device, the primary computing device being most frequently accessed by the user amongst a plurality of computing devices associated with the user, the primary computing device being different from the originating device that generates the notifications;
determining, by the proxy server, whether the location proximity between the first computing device and the primary computing device satisfies a proximity based notification criterion for facilitating transmission of the notifications to the first computing device via a cloud data interface,
wherein the cloud data interface comprises a queuing mechanism to organize one or more data updates received from or sent to the plurality of computing devices; and
responsive to a determination that the location proximity satisfies the proximity based notification criterion, adjusting by the proxy server a frequency of transmission of the notifications to the first computing device as a function of the location proximity,
wherein the instructions for adjusting the frequency comprises instructions for at least one of increasing the frequency of transmission as a location proximity range between the first computing device and the primary computing device decreases, or decreasing the frequency of transmission as the distance location proximity range between the first computing device and the primary computing device increases, wherein the instructions for increasing the frequency of the transmission when the location proximity range decreases comprises instructions for transmitting the notification at a first transmission frequency that is greater than zero when the location proximity is at a first location proximity range, and transmitting the notification at a second transmission frequency that is greater than the first transmission frequency when the location proximity is at a second location proximity range that is less than the first location proximity range.

21. The non-transitory computer readable medium of claim 20 having instructions which, when executed by the processor, further performs the method of storing by the proxy server the notifications, responsive to a determination that the location proximity is not within the proximity based notification criterion, for later transmission to the first computing device.

22. A method comprising:
receiving at a proxy server a request to transmit notifications to a first computing device associated with a user, the request including the notifications from a remote server;
determining, by the proxy server, whether the user is likely to use the first computing device based on an access pattern of the first computing device, the access pattern determined based on historical usage data of the first computing device and a location proximity between the first computing device and a primary computing device, the primary computing device being most frequently accessed by the user amongst a plurality of computing devices associated with the user, the primary computing device being different from the remote server; and
responsive to a determination that the user is likely to use the first computing device, facilitating by the proxy server a transmission of the notifications to the first computing device via a cloud data interface,
wherein the cloud data interface comprises a queuing mechanism to organize one or more data updates received from or sent to the plurality of computing devices, wherein facilitating the transmission of the notifications to the first computing device comprises increasing a frequency of the transmission when a location proximity range between the primary computing device and the first computing device decreases, and decreasing the frequency of the transmission of the notifications when the location proximity range increases, wherein the increasing of the frequency of the transmission when the location proximity range decreases comprises transmitting the notification at a first transmission frequency that is greater than zero when the location proximity is at a first location proximity range, and transmitting the notification at a second transmission frequency that is greater than the first transmission frequency when the location proximity is at a second location proximity range that is less than the first location proximity range.

23. The method of claim 22, wherein determining the access pattern based on the historical usage data and the location proximity includes determining whether the user is likely or not to access the first computing device (a) at a particular a time of the day, (b) at a particular day of the week, (c) at a particular a time of the month, (d) a particular a time of the year, (e) when the primary computing device is within a predefined location proximity range from the first computing device, (f) when the primary computing device is not within a predefined location proximity range from the first computing device, or (g) in relation to an occurrence of an event that is neither associated with the first computing device nor the primary computing device.

* * * * *